United States Patent
Handley et al.

(10) Patent No.: US 8,332,250 B2
(45) Date of Patent: Dec. 11, 2012

(54) SYSTEMS AND METHODS FOR DETERMINING PRINT REVENUE BEHAVIOR

(75) Inventors: John C. Handley, Fairport, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 354 days.

(21) Appl. No.: 12/724,056

(22) Filed: Mar. 15, 2010

(65) Prior Publication Data
US 2011/0225022 A1   Sep. 15, 2011

(51) Int. Cl.
*G06Q 10/00* (2012.01)
*G06Q 40/00* (2012.01)
*G06Q 30/00* (2012.01)

(52) U.S. Cl. ............ 705/7.13; 705/7.11; 705/7.12; 705/7.28; 705/7.29; 705/7.35; 705/348

(58) Field of Classification Search ........ 705/7.11–7.42, 705/348
See application file for complete search history.

(56) References Cited

U.S. PATENT DOCUMENTS

| | | | |
|---|---|---|---|
| 6,516,157 B1* | 2/2003 | Maruta et al. | 399/8 |
| 6,856,430 B1* | 2/2005 | Gase | 358/1.9 |
| 7,576,874 B2* | 8/2009 | Farrell et al. | 358/1.13 |
| 8,055,537 B2* | 11/2011 | Snyder et al. | 705/14.1 |
| 2003/0016388 A1* | 1/2003 | Christodoulou et al. | 358/1.15 |
| 2003/0043401 A1* | 3/2003 | Abel et al. | 358/1.14 |
| 2003/0046171 A1* | 3/2003 | Whale | 705/26 |
| 2003/0115156 A1* | 6/2003 | Baker | 705/400 |
| 2007/0083368 A1* | 4/2007 | Handley | 704/245 |
| 2009/0089192 A1* | 4/2009 | Ferlitsch | 705/33 |
| 2010/0205042 A1* | 8/2010 | Mun | 705/10 |
| 2011/0161245 A1* | 6/2011 | Hollas | 705/36 R |
| 2011/0173116 A1* | 7/2011 | Yan et al. | 705/38 |
| 2012/0116935 A1* | 5/2012 | Nagarajan | 705/34 |

* cited by examiner

*Primary Examiner* — Lynda Jasmin
*Assistant Examiner* — Sujay Koneru
(74) *Attorney, Agent, or Firm* — Fox Rothschild LLP (57) ABSTRACT

Methods and systems for determining print revenue behavior for an account are disclosed. A computing device may determine a print revenue for an account for each of a plurality of time periods. The computing device may select a best fit model from a plurality of models based on the print revenue for the account for the plurality of time periods. The computing device may determine a risk level associated with the account based on a best fit model. The risk level may be based on a difference between the best fit model and the print revenue for the account for each of time period.

20 Claims, 5 Drawing Sheets

SYSTEMS AND METHODS FOR DETERMINING PRINT REVENUE BEHAVIOR

BACKGROUND

A managed service is a service offering in which a vendor assumes operation of a portion of an enterprise's assets and provides technical services and/or supplies for such assets for a fee. As a form of outsourcing, it allows the enterprise to focus on its core business while enabling the assets of the enterprise to receive improved service at reduced cost.

One type of managed service involves managing an enterprise's printer assets and print services (i.e., a managed print service). In a managed print service, a vendor typically provides printing devices to an enterprise. Business intelligence applications can then be utilized to determine how an account is behaving with respect to revenue generation.

The notions of regular behavior and exceptional behavior are fundamental to business intelligence. When large numbers of business or economic processes are aggregated and viewed through collected data, a continuum typically results. Exceptional behavior often is the result of some discrete phenomenon or atypical usage pattern that warrants investigation. Such a phenomenon could represent an exceptional risk or opportunity for the provider of the managed print service.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for determining print revenue behavior for an account may include a computing device and a computer-readable storage medium in communication with the computing device. The computer-readable storage medium may include one or more programming instructions for determining a print revenue for an account for each of a plurality of time periods, selecting a best fit model from a plurality of models based on the print revenue for the account for the plurality of time periods, and determining a risk level associated with the account based on at least the best fit model. The risk level may be based on a difference between the best fit model and the print revenue for the account for each of the plurality of time periods.

In an embodiment, a method for determining print revenue behavior for an account may include determining, by a computing device, a print revenue for an account for each of a plurality of time periods, selecting, by the computing device, a best fit model from a plurality of models based on the print revenue for the account for the plurality of time periods, and determining, by the computing device, a risk level associated with the account based on at least the best fit model. The risk level may be based on a difference between the best fit model and the print revenue for the account for each of the plurality of time periods.

DETAILED DESCRIPTION

The following terms shall have, for the purposes of this application, the respective meanings set forth below.

A "printing device" refers to an electronic device that is capable of receiving commands, printing text characters, vector graphics and/or images on a substrate, and/or scanning images. Printing devices may include, but are not limited to, network printers, production printers, copiers and other devices using ink or toner, and scanners. A printing device may also perform a combination of functions such as printing/scanning, in which case such a device may be considered a multifunctional device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

"Price per impression" or "PPI" refers to the revenue generated from printing an image on a single side of a single sheet of paper and/or other substrate by a printing device.

"Color PPI" refers to the revenue generated from printing a color image on a single side of a single sheet of paper and/or other substrate by a printing device.

"Monochrome PPI" refers to the revenue generated from printing a black-and-white or monochrome image on a single side of a single sheet of paper and/or other substrate by a printing device.

A pricing model for operating color printing devices typically includes a color PPI and a monochrome PPI. In an embodiment, the managed print service uses these values to determine an amount to bill an account by tracking a color impression count and a monochrome impression count in a given billing period and multiplying the impression counts by the color PPI and monochrome PPI, respectively.

A business intelligence application may extract print volumes by account and use a negotiated price per impressions to compute revenue by account for color, monochrome and total printing on a periodic basis, such as monthly. Trends in revenue may be classified into flat, linear (increasing or decreasing) and autoregressive classes. The volatility of each revenue trend may further be evaluated to determine the riskiness of the account. An account that is generating highly fluctuating and/or unpredictable behavior may be deemed riskier to contract with in the future, may result in customer dissatisfaction due to highly varying cost, and/or may represent an opportunity for managing the account in a different manner.

Figure 1:
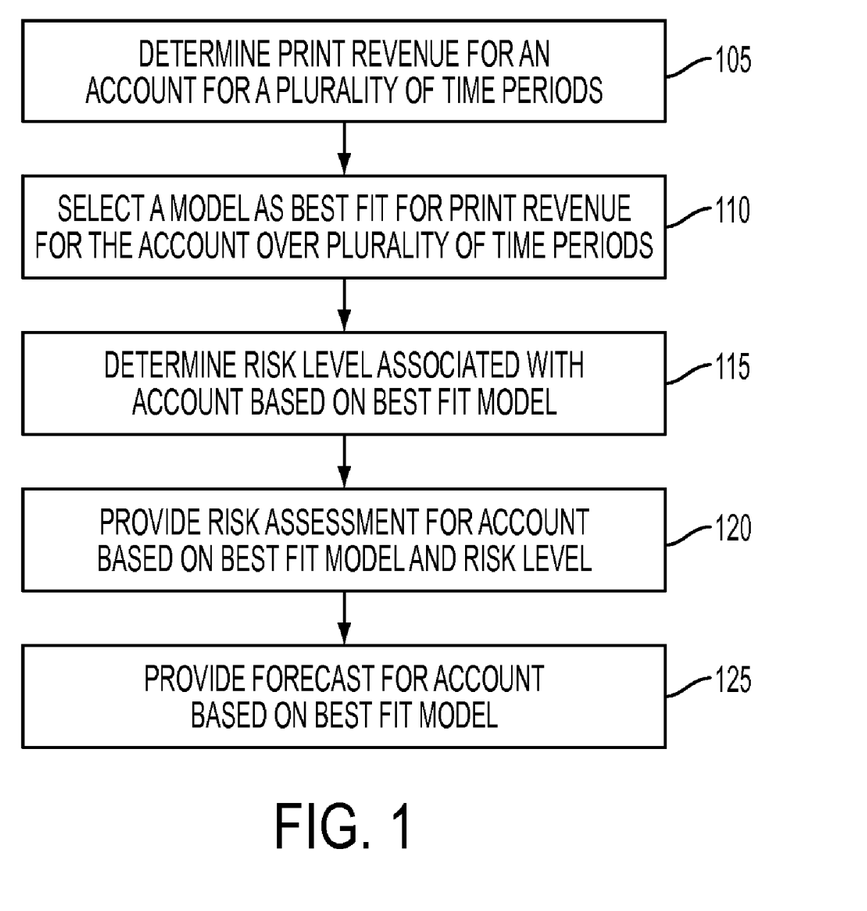
FIG. 1 depicts a flow diagram for determining print revenue behavior for an account according to an embodiment.

FIG. 1 depicts a flow diagram for determining print revenue behavior for an account according to an embodiment. As shown in FIG. 1, print revenue may be determined 105 for an account for each of a plurality of time periods. Each time period may encompass, for example and without limitation, a day, a week, a month, a quarter, a year or any other period of time. The print revenue may be determined 105 automatically by a computing device.

For each time period, the print revenue may be determined 105 by determining a print volume for an account for the time period, identifying a PPI for the account for the time period, and determining a revenue for the account for the time period based on the print volume and the PPI. The print volume may be determined by aggregating information regarding the number of impressions imparted by each printing device within an account and providing such information to a computing device. In an embodiment, a managed print service may operate the computing device to which the print volume information is provided. The PPI for the account may be stored at the computing device for the account or retrieved from a database accessible by the computing device. The print revenue may then be determined 105 by computing the product of the print volume and the PPI.

In an embodiment, a plurality of print volumes and prices per impression may be utilized for a single account in order to determine 105 the print revenue. For example, a color print volume and a monochrome print volume may be received from an account by the computing device, which stores or can access separate color PPI and monochrome PPI amounts for the account. In such an embodiment, the print revenue for a time period may be determined 105 by summing the product of the color print volume and color PPI with the product of the monochrome print volume and the monochrome PPI. Additional and/or alternate print volumes and prices per impression may be used within the scope of this disclosure.

One of a plurality of models may be selected 110 as a best fit for the print revenue for the account over the plurality of time periods. Fitting a trend or time series of periodic revenue data may be performed with respect to a plurality of models. In an embodiment, one or more of the following models may be used: linear (either ascending or descending), flat, first-order autoregressive and second-order autoregressive. A linear model may have the form $x_i = \beta_0 + \beta_1 i + \epsilon_i$, $\epsilon_i \sim N(0, \sigma^2)$, where $x_i$ is the print revenue for period i, $\beta_n$ are constant coefficients, and $\epsilon_i$ is the variance for the print revenue at a given time period. As shown above, the print revenue may be deemed to vary with a Normal distribution. Similarly, the flat model may have the form $x_i = \beta_0 + \epsilon_i$, $\epsilon_i \sim N(0, \sigma^2)$. The linear model and flat model are also referred to herein as model 1 and model 2, respectively.

The autoregressive models are more likely to fit print revenue time series that include data points that fluctuate significantly. With such models, the print revenue for a particular time period is modeled as being dependent upon one or more previous time periods. For example, the form for the first-order autoregressive model may be $x_i = \beta_0 + \beta_1 x_{i-1} + \epsilon_i$, $\epsilon_i \sim N(0, \sigma^2)$. In other words, the first-order autoregress model models the print revenue for a particular time period as depending in part on the print revenue for the previous time period (i.e., $x_{i-1}$). Similarly, the form for the second-order autoregressive model may be $x_i = \beta_0 + \beta_1 x_{i-1} + \beta_2 x_{i-2} + \epsilon_i$, $\epsilon_i \sim N(0, \sigma^2)$. As such, the second-order autoregressive model models the print revenue for a particular time period as depending in part on the print revenues for the previous two time periods (i.e., $x_{i-1}$ and $x_{i-2}$). The first-order and second-order autoregressive models are also referred to herein as model 3a and model 3b, respectively. Alternate and/or additional models may be used within the scope of this disclosure.

For each model equation, a maximum likelihood estimate may be determined for each of the one or more coefficients, $\beta_n$. The maximum likelihood estimates may be the values that cause the corresponding model equation to most closely approximate the print revenues for the plurality of time periods. In an embodiment, the maximum likelihood estimates for a model equation may be the coefficients that minimize the sum of squared errors between the data and the model equation over the identified plurality of time periods.

The model that has the equation with maximum likelihood estimate coefficients that most closely approximates the print revenues for the plurality of time periods may be selected as the model representing the print revenue for the account. In an embodiment, determining the model that most closely approximates the print revenue over time may be performed by determining a value for an information criterion, such as Akaike's Information Criterion ("AIC"), for each model and selecting the model having the smallest value for the information criterion. Additional and/or alternate information criteria, such as the Bayesian Information Criterion and/or the Deviance Information Criterion, may also be used within the scope of this disclosure.

The information criterion may be determined for each model given the print revenue data for an account. For example, the AIC may be determined for each of the linear, flat, first-order autoregressive and second-order autoregressive model equations having maximum likelihood estimate coefficients. Such values are identified herein as AIC1, AIC2, AIC3a, and AIC3b, respectively. The model having the lowest AIC may comprise the best explanation of the data in a statistical (information theoretic) sense.

AIC is a way to rank models according to how well they fit the data. The criterion compensates for the number of parameters used to make the fit, because the more parameters in a model, the more flexible the model is and the better it can fit the data. More particularly, AIC=−2 log L+2K, where L is the maximized likelihood function and K is the number of parameters used in the model.

As such, let the data comprise n observations of print revenue, $x_1, \ldots, x_n$. Because the second-order autoregressive model does not use the first two observations for the model fit only the last n−2 observations ($x_3, \ldots, x_n$) are used for all models.

Model 1 (Linear):

$$L(x_3, \ldots, x_n; \beta_0, \beta_1, \sigma^2) = \prod_{i=3}^{n} \frac{1}{\sqrt{2\pi\sigma^2}} \exp\left(-\frac{1}{2\sigma^2}(x_i - \beta_0 - \beta_1 i)^2\right)$$

Then, maximize L over $\beta_0, \beta_1, \sigma^2$ to obtain maximum likelihood estimates $\hat{\beta}_0, \hat{\beta}_1, \hat{\sigma}^2$.

$$\log L(x_3, \ldots, x_n; \hat{\beta}_0, \hat{\beta}_1, \hat{\sigma}^2) =$$

$$-\frac{(n-2)}{2}\log(2\pi\hat{\sigma}^2) - \frac{1}{2\hat{\sigma}^2}\sum_{i=3}^{n}(x_i - \hat{\beta}_0 - \hat{\beta}_1 i)^2,$$

$$K = 3.$$

As such, $$AIC_1 = (n-2)\log(2\pi\hat{\sigma}^2) + \frac{1}{\hat{\sigma}^2}\sum_{i=3}^{n}(x_i - \hat{\beta}_0 - \hat{\beta}_1 i)^2 + 6.$$

Model 2 (Flat):

$$L(x_3, \ldots, x_n; \beta_0, \sigma^2) = \prod_{i=3}^{n} \frac{1}{\sqrt{2\pi\sigma^2}} \exp\left(-\frac{1}{2\sigma^2}(x_i - \beta_0)^2\right)$$

maximize L over $\beta_0, \sigma^2$ to obtain maximum likelihood estimates $\hat{\beta}_0, \hat{\sigma}^2$.

$$\log L(x_3, \ldots, x_n; \hat{\beta}_0, \hat{\sigma}^2) = -\frac{(n-2)}{2}\log(2\pi\hat{\sigma}^2) - \frac{1}{2\hat{\sigma}^2}\sum_{i=3}^{n}(x_i - \hat{\beta}_0)^2,$$

$K = 2.$

As such, $$AIC_2 = (n-2)\log(2\pi\hat{\sigma}^2) + \frac{1}{\hat{\sigma}^2}\sum_{i=3}^{n}(x_i - \hat{\beta}_0)^2 + 4.$$

Model 3a (First-order Autoregressive):

$$L(x_3, \ldots, x_n; \beta_0, \beta_1, \sigma^2) =$$

$$\prod_{i=3}^{n} \frac{1}{\sqrt{2\pi\sigma^2}}\exp\left(-\frac{1}{2\sigma^2}(x_i - \beta_0 - \beta_1(x_{i-1} - \beta_0))^2\right)$$

maximize L over $\beta_0, \beta_1, \sigma^2$ to obtain maximum likelihood estimates $\hat{\beta}_0, \hat{\beta}_1, \hat{\sigma}^2$.

$$\log L(x_3, \ldots, x_n; \hat{\beta}_0, \hat{\beta}_1, \hat{\sigma}^2) =$$

$$-\frac{(n-2)}{2}\log(2\pi\hat{\sigma}^2) - \frac{1}{2\hat{\sigma}^2}\sum_{i=3}^{n}(x_i - \hat{\beta}_0 - \hat{\beta}_1(x_{i-1} - \hat{\beta}_0))^2,$$

$K = 3.$

As such, $$AIC_{3a} = (n-2)\log(2\pi\hat{\sigma}^2) + \frac{1}{\hat{\sigma}^2}\sum_{i=3}^{n}(x_i - \hat{\beta}_0 - \hat{\beta}_1(x_{i-1} - \hat{\beta}_0))^2 + 6.$$

Model 3b (Second-order Autoregressive):

$$L(x_3, \ldots, x_n; \beta_0, \beta_1, \beta_2, \sigma^2) =$$

$$\prod_{i=3}^{n} \frac{1}{\sqrt{2\pi\sigma^2}}\exp\left(-\frac{1}{2\sigma^2}(x_i - \beta_0 - \beta_1(x_{i-1} - \beta_0) - \beta_2(x_{i-2} - \beta_0))^2\right)$$

maximize L over $\beta_0, \beta_1, \beta_2, \sigma^2$ to obtain maximum likelihood estimates $\hat{\beta}_0, \hat{\beta}_1, \hat{\beta}_2, \hat{\sigma}^2.$ $$\log L(x_3, \ldots, x_n; \hat{\beta}_0, \hat{\beta}_1, \hat{\sigma}^2) =$$

$$-\frac{(n-2)}{2}\log(2\pi\hat{\sigma}^2) - \frac{1}{2\hat{\sigma}^2}\sum_{i=3}^{n}(x_i - \hat{\beta}_0 - \hat{\beta}_1(x_{i-1} - \hat{\beta}_0) - \hat{\beta}_2(x_{i-2} - \hat{\beta}_0))^2$$

$K = 4.$

As such, $$AIC_{3b} =$$

$$(n-2)\log(2\pi\hat{\sigma}^2) + \frac{1}{\hat{\sigma}^2}\sum_{i=3}^{n}(x_i - \hat{\beta}_0 - \hat{\beta}_1(x_{i-1} - \hat{\beta}_0) - \hat{\beta}_2(x_{i-2} - \hat{\beta}_0))^2 + 8.$$

Referring back to FIG. 1, a risk level associated with the account may be determined 115 based on at least the best fit model. The risk for an account is defined as an uncertainty in cost or in predicting revenue. The risk may also be measured statistically as the inability to forecast future data points or as a projected forecast error. In general, a statistical model of time series data has two parts, a systematic part and a random part. The statistical part may be modeled, such as by using the best fit model described above that describes the behavior of the print revenue. The random part is the part of the data that cannot be modeled systematically. In general, the larger the random part of the data is, the less it can be predicted by the model and the more uncertainty is ascribed to chance. The risk level enables the measurement of the amount of risk across accounts of various sizes because dividing by an average data value for the print revenue enables normalization of account data. Further information regarding the risk level is included below.

Once the best fit model is determined 110, the risk of the data can be assessed 115. The best fit model identifies the systematic and/or structural behavior of the data. The remaining difference between the best fit model and the actual data for a particular time period is the error associated with that time period. For example, if the best fit model is a linear model, the error for time period i may be determined using the following formula: $err_i = x_i - \hat{\beta}_0 - \hat{\beta}_1 i$, where $\hat{\beta}_0$ and $\hat{\beta}_1$ are maximum likelihood estimates. Similar equations may be identified for the flat model ($err_i = x_i - \hat{\beta}\hat{\beta}_0$), first-order autoregressive model ($err_i = x_i - \hat{\beta}_0 - \hat{\beta}_1 x_{i-1}$) and second-order autoregressive model ($err_i = x_i - \hat{\beta}_0 - \hat{\beta}_1 x_{i-1} - \hat{\beta}_2 x_{i-2}$). This error can be represented as an unpredictable portion of the best fit model associated with the risk inherent in the model.

In an embodiment, determining 115 a risk level may include determining an error value for each time period. The error value may be equal to the difference between the print revenue for the time period and an estimated value for the print revenue for the time period based on the best fit model. The error values for the time periods may then be used to determine a median absolute deviation of the error values using the following formula: $MAD(err_i) = \text{median}_i |(err_i - \text{median}_j(err))|*C$, where $MAD(err_i)$ is the median absolute deviation of the error values for each time period i. The median absolute deviation is equal to the product of a constant value C and the median of the absolute values of the difference between each error value for a time period and the median value of the error values for each time period. In an embodiment, the constant value C may equal 1.4826. The risk value may then be determined 115 based on the median absolute deviation and the median value of the print revenues for each time period. For example, the risk value may be determined 115 to be the median absolute deviation divided by the median value of the print revenues for each time period.

In an alternate embodiment, the risk level associated with the account may be determined 115 using the standard deviation and mean of the print revenues for each time period. In such an embodiment, the standard deviation and mean of the print revenues for each time period may be determined. The risk level may then be determined 115 based on the standard deviation and the mean. For example, the risk level may be determined 115 to be the standard deviation of the print revenues for each time period divided by the mean of the print revenues for each time period. Additional and/or alternate methods of determining 115 a risk level may be used within the scope of this disclosure.

In an embodiment, a risk assessment may be provided 120 for the account based on at least the best fit model and the risk level. The risk assessment may be provided 120 to, for example, an account manager for the managed print service. In an embodiment, the risk assessment may suggest that the account should be modified or cancelled if, for example, the risk level is relatively high and the print revenue is relatively low. Alternately, if the risk level is relatively low, the risk assessment may not suggest that any changes be made with respect to the account or may encourage the account manager to provide additional services to the account in order to increase print revenue from the account. In an embodiment, the best fit model may be used to determine projected revenue for an account as part of a risk assessment. Alternate and/or additional recommendations may be provided 120 as part of a risk assessment within the scope of this disclosure.

In general, based upon the risk level for a particular account, an account manager may assess whether the risk level is too high in relation to the print revenue generated from an account in light of the provided risk assessment. If so, one or more actions may be taken with respect to the account. For example, the account manager may determine that the contract governing the account should be re-negotiated to account for variability in the print revenue over time. Alternately, the account manager may determine that the account should be closed. One or more additional and/or alternate actions may be performed based on the risk assessment within the scope of this disclosure.

In an embodiment, a forecast for the account may be provided 125 based on at least the best fit model. The forecast may be determined using the best fit model with the maximum likelihood estimate coefficients for the model. For example, if the best fit model is a linear model, the forecast for the next time period may be determined 125 using the following formula: $\hat{x}_{n+1}^1 = \hat{\beta}_0 + \hat{\beta}_1(n+1)$, where $\hat{\beta}_0$ and $\hat{\beta}_1$ are maximum likelihood estimates and (n+1) is a number assigned to the next time period. Similarly, if the best fit model is the flat model, the forecast for the next time period may be determined 125 using the following formula: $\hat{x}_{n+1}^2 = \hat{\beta}_0$. A first-order autoregressive model forecast may be determined 125 using $\hat{x}_{n+1}^{3a} = \hat{\beta}_0 + \hat{\beta}_1 x_n$, and a second-order autoregressive model forecast may be determined 125 using $\hat{x}_{n+1}^{3b} = \hat{\beta}_0 + \hat{\beta}_1 x_n + \hat{\beta}_2 x_{n-1}$. The forecast may then be provided to a user, such as an account manager.

In an alternate embodiment, a forecast may be determined 125 using a weighted average of the four models using the AICs for each model. The Akaike weights may be computed using the following formulas:

$$\Delta_1 = AIC_1 - \min(AIC_1, AIC_2, AIC_{3a}, AIC_{3b})$$

$$\Delta_2 = AIC_2 - \min(AIC_1, AIC_2, AIC_{3a}, AIC_{3b})$$

$$\Delta_{3a} = AIC_{3a} - \min(AIC_1, AIC_2, AIC_{3a}, AIC_{3b})$$

$$\Delta_{3b} = AIC_{3b} - \min(AIC_1, AIC_2, AIC_{3a}, AIC_{3b})$$

$$w_1 = \frac{e^{-\Delta_1/2}}{e^{-\Delta_1/2} + e^{-\Delta_2/2} + e^{-\Delta_{3a}/2} + e^{-\Delta_{3b}/2}}$$

$$w_2 = \frac{e^{-\Delta_2/2}}{e^{-\Delta_1/2} + e^{-\Delta_2/2} + e^{-\Delta_{3a}/2} + e^{-\Delta_{3b}/2}}$$

$$w_{3a} = \frac{e^{-\Delta_{3a}/2}}{e^{-\Delta_1/2} + e^{-\Delta_2/2} + e^{-\Delta_{3a}/2} + e^{-\Delta_{3b}/2}}$$

$$w_{3b} = \frac{e^{-\Delta_{3b}/2}}{e^{-\Delta_1/2} + e^{-\Delta_2/2} + e^{-\Delta_{3a}/2} + e^{-\Delta_{3b}/2}}$$

The model averaged forecast may then be determined 125 by the weighted average: $\hat{x}_{n+1} = w_1 \hat{x}_{n+1}^1 + w_2 \hat{x}_{n+1}^2 + w_{3a} \hat{x}_{n+1}^{3a} + w_{3b} \hat{x}_{n+1}^{3b}$.

EXAMPLES

Figure 2A:
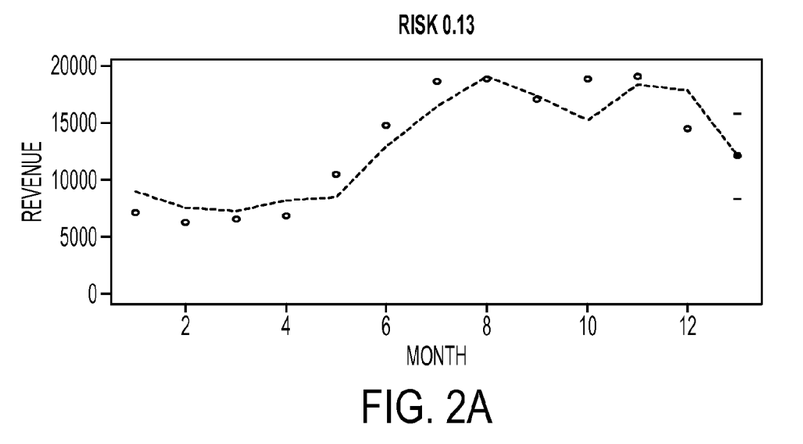
FIGS. 2A-2C depict graphs of exemplary print revenue trends for a plurality of time periods.
Figure 2B:
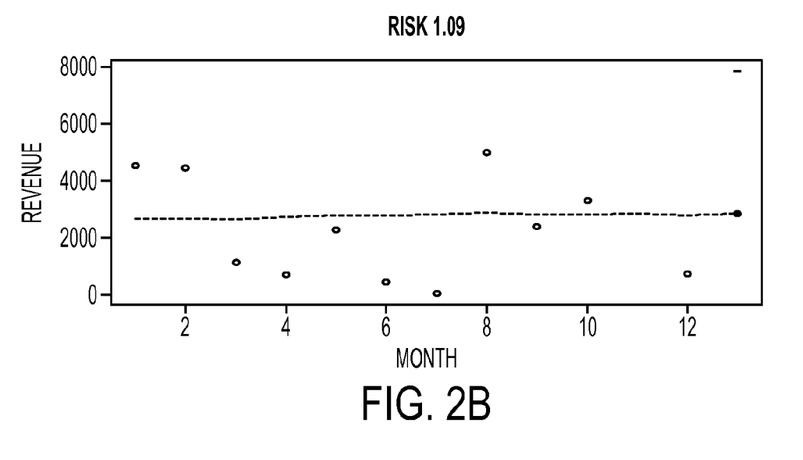
Figure 2C:
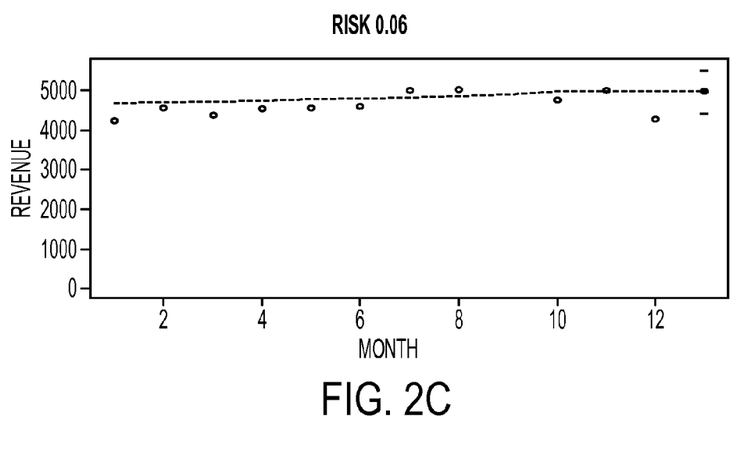

FIGS. 2A-2C depict graphs of exemplary print revenue trends for a plurality of time periods. Each graph in FIGS. 2A-2C has an associated risk level determined based on the print revenue for each time period. FIG. 2A depicts an exemplary low risk (risk level=0.16) autoregressive revenue trend in which the dotted line is the fitted model and the final value is the forecast value with a 95% confidence interval. FIG. 2B depicts an exemplary high risk (risk level=1.09) flat revenue trend in which the dotted line is the fitted model and the final value is the forecast value with a 95% confidence interval. FIG. 2C depicts an exemplary low risk (risk level=0.06) linearly increasing revenue trend in which the dotted line is the fitted model and the final value is the forecast value with a 95% confidence interval.

Figure 3A:
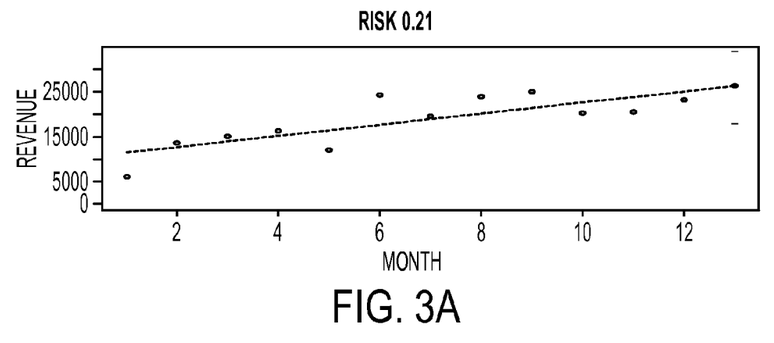
FIGS. 3A-3C depict graphs of various information for a particular account.
Figure 3B:
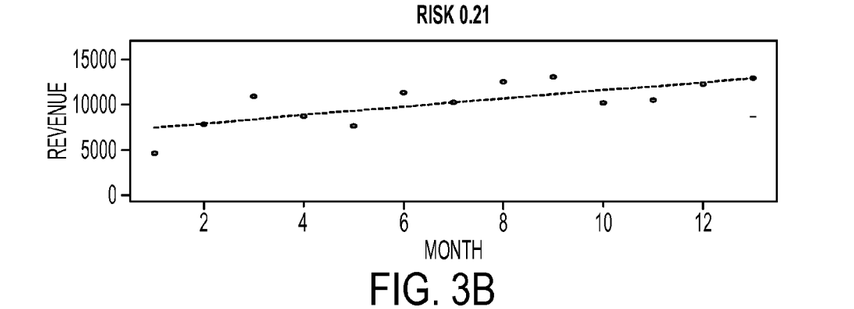
Figure 3C:
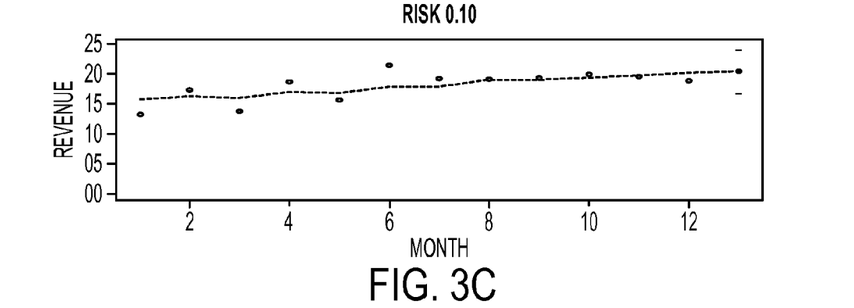

FIGS. 3A-3C depict graphs of various information for a particular account. FIG. 3A depicts an exemplary low risk (risk level=0.21) linearly increasing revenue trend for color print revenue for an account in which the dotted line is the fitted model and the final value is the forecast value with a 95% confidence interval. FIG. 3B depicts an exemplary low risk (risk level=0.21) linearly increasing revenue trend for monochrome print revenue for the account in which the dotted line is the fitted model and the final value is the forecast value with a 95% confidence interval. FIG. 3C depicts an exemplary graph charting the ratio of color print revenue to monochrome print revenue in which the dotted line is the fitted model and the final value is the forecast value with a 95% confidence interval. Any or all of this data may be utilized by an account manager to determine modifications to a particular account.

Figure 4:
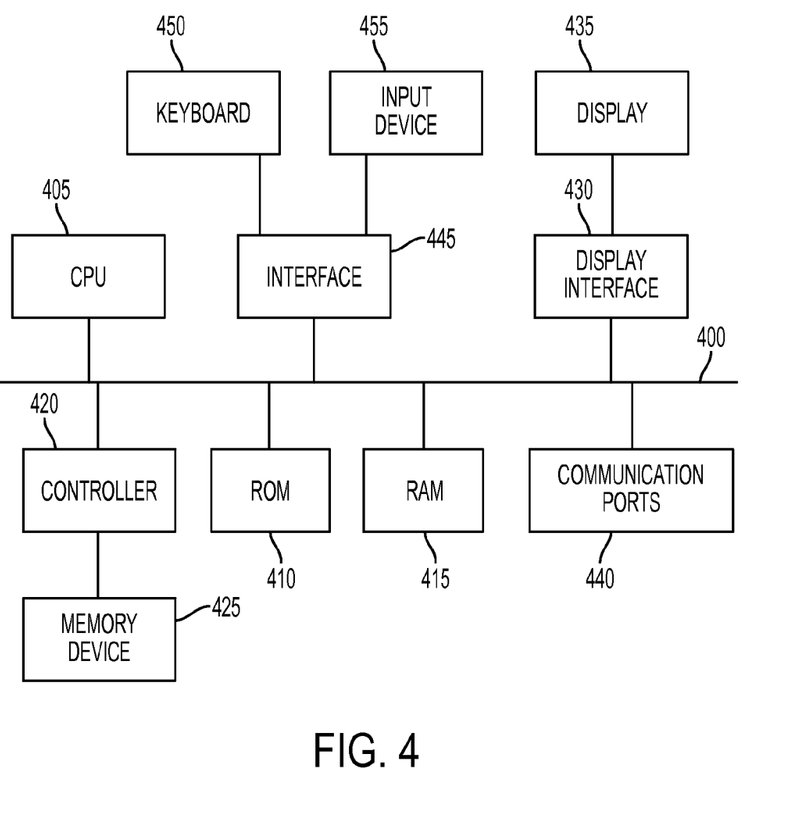
FIG. 4 depicts a block diagram of exemplary internal hardware that may be used to contain or implement program instructions according to an embodiment.

FIG. 4 depicts a block diagram of exemplary internal hardware that may be used to contain or implement program instructions according to an embodiment. A bus 400 serves as the main information highway interconnecting the other illustrated components of the hardware. CPU 405 is the central processing unit of the system, performing calculations and logic operations required to execute a program. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

An embedded system, such as a sub-system within a printing device or xerographic device, may optionally be used to perform one, some or all of the operations described herein. Likewise, a multiprocessor system may optionally be used to perform one, some or all of the operations described herein.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for determining print revenue behavior for an account, the system comprising:
a computing device; and
a computer-readable storage medium in communication with the computing device, wherein the computer-readable storage medium comprises one or more programming instructions for:
determining a print revenue for an account for each of a plurality of time periods, wherein the print revenue comprises a trend classified as at least one of flat, linear, and autoregressive,
selecting a best fit model from a plurality of models based on the print revenue for the account for the plurality of time periods such that the best fit model corresponds to the print revenue trend, wherein selecting a best fit model comprises:
identifying a plurality of models, wherein each model describes a format for an associated equation, wherein the format comprises one or more coefficients,
for each equation, determining a maximum likelihood estimate for each of the one or more coefficients, wherein the maximum likelihood estimates cause the equation to approximate the print revenues for the plurality of time periods, and
selecting the model from the plurality of models having the equation with the maximum likelihood estimates that most closely approximates the print revenues for the plurality of time periods, wherein selecting the model from the plurality of models comprises:
determining a value for Akaike's Information Criterion for each model, and
selecting the model having the smallest Akaike's Information Criterion value, and
determining a risk level associated with the account based on at least the best fit model, wherein the risk level is based on a difference between the best fit model and the print revenue for the account for each of the plurality of time periods.

2. The system of claim 1 wherein the one or more programming instructions for determining a print revenue comprise one or more programming instructions for:
for each time period:
determining a print volume for an account for the time period,
identifying a price per impression for the account for the time period, and
determining a revenue for the account for the time period based on the print volume and the price per impression.

3. The system of claim 1 wherein the one or more programming instructions for determining a print revenue comprise one or more programming instructions for:
for each time period:
determining a color print volume and monochrome print volume for an account for the time period,
identifying a color price per impression and a monochrome price per impression for the account for the time period, and
determining a revenue for the account for the time period based on the color print volume, the color price per impression, the monochrome print volume and the monochrome price per impression.

4. The system of claim 1 wherein the plurality of models comprise a linear model; a flat model; and one or more autoregressive models.

5. The system of claim 1 wherein the computer-readable storage medium further comprises one or more instructions for:
providing a forecast for the account based on at least the best fit model.

6. The system of claim 5 wherein the one or more programming instructions for providing a forecast comprise one or more programming instructions for:
determining a forecasted revenue for a future time period based on the equation for the best fit model and the maximum likelihood estimates for the equation.

7. The system of claim 5 wherein the one or more programming instructions for providing a forecast comprise one or more programming instructions for:
for each model:
determining a weight for the model based on at least a value for Akaike's Information Criterion for the model,
determining a forecasted revenue for the model for a future time period based on the equation for the model and the maximum likelihood estimates for the equation, and
determining a weighted forecast for the model based on the weight for the model and the forecasted revenue for the model; and
determining a forecasted revenue for the future time period based on the sum of the weighted forecasts for each model.

8. The system of claim 1 wherein the one or more programming instructions for determining a risk level comprise one or more instructions for:
for each time period, determining an error value equal to the difference between the print revenue for the time period and the estimated value for the print revenue for the time period based on the best fit model;
determining the median absolute deviation of the error values over each time period, wherein the median absolute deviation is equal to the product of a constant value and the median of the absolute values of the difference between each error value for a time period and the median value of the error values for each time period; and
determining the risk level based on the median absolute deviation and the median value of the print revenues for each time period.

9. The system of claim 1 wherein the one or more programming instructions for determining a risk level comprise one or more instructions for:
determining a standard deviation of the print revenues for each time period;
determining a mean of the print revenues for each time period; and
determining the risk level based on the standard deviation of the print revenues and the mean of the print revenues.

10. The system of claim 1 wherein the one or more programming instructions further comprise one or more programming instructions for:
providing a risk assessment for the account based on at least the best fit model and the risk level.

11. A method for determining print revenue behavior for an account, the method comprising:

determining, by a computing device, a print revenue for an account for each of a plurality of time periods, wherein the print revenue comprises a trend classified as at least one of flat, linear and autoregressive;

selecting, by the computing device, a best fit model from a plurality of models based on the print revenue for the account for the plurality of time periods such that the best fit model corresponds to the print revenue trend, wherein selecting a best fit model comprises:

identifying a plurality of models, wherein each model describes a format for an associated equation, wherein the format comprises one or more coefficients;

for each equation, determining a maximum likelihood estimate for each of the one or more coefficients, wherein the maximum likelihood estimates cause the equation to approximate the print revenues for the plurality of time periods; and selecting the model from the plurality of models having the equation with the maximum likelihood estimates that most closely approximates the print revenues for the plurality of time periods, wherein selecting the model from the plurality of models comprises:

determining a value for Akaike's Information Criterion for each model, and selecting the model having the smallest Akaike's Information Criterion value; and determining, by the computing device, a risk level associated with the account based on at least the best fit model, wherein the risk level is based on a difference between the best fit model and the print revenue for the account for each of the plurality of time periods.

12. The method of claim 11 wherein determining a print revenue comprises, for each time period:

determining a print volume for an account for the time period;

identifying a price per impression for the account for the time period; and determining a revenue for the account for the time period based on the print volume and the price per impression.

13. The method of claim 11 wherein determining a print revenue comprises, for each time period:

determining a color print volume and a monochrome print volume for an account for the time period;

identifying a color price per impression and a monochrome price per impression for the account for the time period; and determining a revenue for the account for the time period based on the color print volume, the color price per impression, the monochrome print volume and the monochrome price per impression.

14. The method of claim 11 wherein the plurality of models comprise a linear model; a flat model; and one or more autoregressive models.

15. The method of claim 11, further comprising:

providing, by the computing device, a forecast for the account based on at least the best fit model.

16. The method of claim 15 wherein providing a forecast comprises determining a forecasted revenue for a future time period based on the equation for the best fit model and the maximum likelihood estimates for the equation.

17. The method of claim 15 wherein providing a forecast comprises:

for each model:

determining a weight for the model based on at least a value for Akaike's Information Criterion for each model, determining a forecasted revenue for the model for a future time period based on the equation for the model and the maximum likelihood estimates for the equation, and determining a weighted forecast for the model based on the weight for the model and the forecasted revenue for the model; and determining a forecasted revenue for the future time period based on the sum of the weighted forecasts for each model.

18. The method of claim 11 wherein determining a risk level comprises:

for each time period, determining an error value equal to the difference between the print revenue for the time period and the estimated value for the print revenue for the time period based on the best fit model;

determining the median absolute deviation of the error values over each time period, wherein the median absolute deviation is equal to the product of a constant value and the median of the absolute values of the difference between each error value for a time period and the median value of the error values for each time period; and determining the risk level based on the median absolute deviation and the median value of the print revenues for each time period.

19. The method of claim 11 wherein determining a risk level comprises:

determining a standard deviation of the print revenues for each time period;

determining a mean of the print revenues for each time period; and determining the risk level based on the standard deviation of the print revenues and the mean of the print revenues.

20. The method of claim 11, further comprising:

providing a risk assessment for the account based on at least the best fit model and the risk level.

* * * * *